United States Patent [19]

Nelb, II et al.

[11] Patent Number: 4,579,914

[45] Date of Patent: Apr. 1, 1986

[54] BLENDS OF POLYESTERAMIDES AND POLYAMIDES

[75] Inventors: Robert G. Nelb, II; Kemal Onder, both of North Haven; Keith G. Saunders, Cheshire, all of Conn.

[73] Assignee: The Dow Chemical Company, Midland, Mich.

[21] Appl. No.: 712,598

[22] Filed: Mar. 18, 1985

[51] Int. Cl.$^4$ .................. C08L 77/00; C08F 283/04
[52] U.S. Cl. .............................. 525/425; 525/432
[58] Field of Search ............................. 525/425, 432

[56] References Cited

U.S. PATENT DOCUMENTS 3,636,135 1/1972 Garforth ........................... 525/432
3,839,245 10/1974 Schlossman et al. ............... 525/425
4,129,715 12/1978 Chen et al. ........................... 528/67
4,473,688 9/1984 Zappa et al. ....................... 525/432

Primary Examiner—Allan M. Lieberman
Assistant Examiner—A. L. Carrillo
Attorney, Agent, or Firm—J. S. Rose

[57] ABSTRACT

Disclosed are novel blends comprising segmented polyesteramides with minor amounts of aliphatic polyamides.

The blends are characterized by good physical properties including improved elongation and solvent resistance over the base polyesteramides. The polymers so obtained find utility in the making of seals, gaskets, bushings, and the like.

15 Claims, No Drawings

BLENDS OF POLYESTERAMIDES AND POLYAMIDES

FIELD OF THE INVENTION

This invention relates to modified polyesteramides and is more particularly concerned with blends of segmented polyesteramides with aliphatic polyamides.

DESCRIPTION OF THE PRIOR ART

Segmented polyesteramides of the type disclosed in U.S. Pat. No. 4,129,715 are characterized by a combination of very useful properties such as good high temperature resistance, wide range of hardness values, and excellent tensile properties including good elongation. These properties are combined in materials which are readily injection moldable into complicated shapes. Inconveniently, when one needs to increase the hardness of the polyesteramide a whole new polymer must be prepared containing a higher proportion of hard segment in the recurring units. Increasing the hardness this way also tends to lower the other physical properties.

Zappa et al (U.S. Pat. No. 4,473,688) have modified the low temperature impact strengths of nylon polyamides by incorporating in the polymer a very small proportion (3 to 10 percent by weight) of a polyesteramide which differs markedly from the polyesteramides of U.S. Pat. No. 4,129,715 by having as the hard segment in the recurring units one which is derived from a low molecular weight alpha, omega-dihydroxyalkane.

We have now found that, by incorporating into the polyesteramides of the type set forth in U.S. Pat. No. 4,129,715 minor amounts of aliphatic polyamides, it is possible not only to increase their hardness but also in many cases to improve their solvent resistance as well as maintaining the other good physical properties.

Surprisingly, the percent elongation of the molded parts made from the blends are higher than the virgin polyesteramides. This unexpected result occurs in spite of the fact that the polyamide being added has elongation values far below the levels of the virgin polyesteramide itself.

SUMMARY OF THE INVENTION

The present invention relates to novel polymer blends comprising (a) from about 99 to about 50 percent by weight of a segmented polyesteramide characterized by a recurring unit of the formula (I)

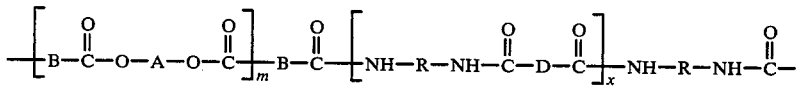

wherein R is selected from the class consisting of arylene of the formulae:

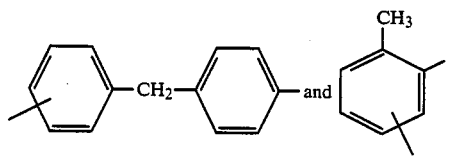

and mixtures thereof, A is the residue of a polymeric diol HOAOH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 300° C., and x is a number having an average value from zero to 10; and (b) from about 1 to about 50 percent by weight of an aliphatic polyamide.

The term "polymeric diol" which is used herein to characterize residue A in formula (I) above is inclusive of polyether and polyester diols having molecular weights within the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like, and copolymers of said alkadienes with vinyl monomers such as acrylonitrile, methacrylonitrile, styrene, and the like. Preferred polyether diols for use in preparing the polyesteramides are poly(tetramethylene glycol) and ethylene oxide-capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol, 1,6-hexanediol and the like, including mixtures of two or more such diols.

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, lies within the stated range and $CnH_{2n}$ represents straight or branched chain alkylene having the appropriate carbon atom content. Illustrative of such acids are adipic, pimelic, suberic, azelaic, sebacic, 1,11-undecandioic, and 1,12-dodecandioic, brassylic, α-methyladipic, α,α-dimethyladipic, α-ethylpimelic, α-ethyl-α-methylpimelic, β,β'-diethyl-β,β'-dimethyl-suberic, 2,2,4-trimethyladipic, 2,4,4-trimethyladipic, α,α-dimethylazelaic and α,α,α',α'-tetramethylsebacic acids.

The term "dicarboxylic acid HOOC—D—COOH" is inclusive of straight and branched chain aliphatic dicarboxylic acids which do not raise the melt temperature of the hard section of the polymer into which they are introduced above about 300° C. Illustrative of such acids are adipic, azelaic, sebacic, suberic, 1,11-undecandioic, 1,12-dodecandioic, brassylic, and trimethyladipic acids. Particularly preferred are azelaic and adipic as well as a mixture of approximately equimolar amounts of these two acids.

The term "aliphatic polyamide" means a composition of a linear polymer having the carbonamide group —CONH (hereinafter —AB—) linked in either —AABB— or —AB— relationship and wherein the divalent radicals within the respective monomer units are $C_2$ to $C_{12}$ alkylene such as ethylene, propylene, butylene, pentylene, hexylene, heptylene, octylene, nonylene, decylene, undecylene, dodecylene, and isomeric forms thereof.

DETAILED DESCRIPTION OF THE INVENTION

The invention is directed broadly to a blend of the segmented polyesteramide defined above with a minor amount of an aliphatic polyamide.

The segmented polyesteramide component of the blends of the invention can be any of those polyesteramides which are described in U.S. Pat. No. 4,129,715, the disclosure of which is incorporated herein by reference. Detailed procedures for the preparation of the polyesteramides are given in the aforesaid patent and will not be repeated herein for the interest of brevity.

The preferred polyesteramides for use in preparing the polymer blends of the invention are those having the following limitations in the recurring unit of formula (I): R is methylenebis(phenylene) particularly 4,4'-methylenebis(phenylene); A is the residue of a polyester diol which is the hydroxyl terminated product of reaction of adipic, azelaic, or 1,12-dodecanedioic acid with an excess of 1,4-butanediol, or 1,6-hexanediol; B and D are the residues of an aliphatic dicarboxylic acid, particularly adipic or azelaic acids, and mixtures thereof; it will be readily understood that, if, instead of using the excess of the diol when preparing the polyester, an excess of the acid is employed then a larger segment of the preferred recurring unit is obtained directly which would include the residue B of the dicarboxylic acid; and x has a value greater than 0.

The linear aliphatic polyamide component defined above of the present blends can be any of the well-known crystalline aliphatic polyamides which are readily available commercially. Generally speaking, such aliphatic polyamides have a number average molecular weight, as determined by known end-group analysis, of from about 5,000 to about 50,000. Illustrative of the polyamides but not limiting thereof are nylon 6 (polycaprolactam), nylon 66 [poly(hexamethyleneadipamide)], nylon 610 [poly(hexamethylenesebacamide)], nylon 3 [poly($\beta$-alanine)], nylon 4 (polybutyrolactam), nylon 612 [poly(hexamethylenedodecanamide)], nylon 11 (polyundecanolactam), and nylon 12 (polylaurolactam). A preferred group of polyamides comprises nylon 6 and nylon 66.

The polyamides generally have an inherent viscosity of at least 0.5 dl/g. measured as a 0.5 percent w/w solution in m-cresol.

The proportions in which the polyesteramide component and polyamide component are employed in the blends is generally within the range of about 99 to about 50 percent by weight of polyesteramide with the complementary 1 to 50 percent comprising the polyamide.

Preferably, the polyesteramide falls within 95 to 60 percent by weight with the polyamide being 5 to 40 percent by weight.

The blends can be prepared in any convenient manner. For example, by bringing together the two components in solid form and dry-blending using conventional means such as a barrel mixer, a tumble mixer, and the like, followed by fluxing or melt-blending in an appropriate apparatus such as a Banbury type internal mixer, rubber mill, twin screw compounder, and the like. Preferably, the two components are brought together and processed in an appropriate melt extruder from which the blend is extruded in the form of strands and the like which are then pelletized for injection molding purposes. Standard techniques and apparatus well-known in the art can be used for these purposes.

The compositions of the invention can also incorporate various additives such as fillers, antioxidants, pigments, fire retardants, plasticizers, reinforcing agents such as glass fiber and the like, which are commonly employed in the art in polyesteramide compositions. The additives are readily incorporated into the blends during the formation of the latter using any of the procedures described above.

The blends in accordance with the invention are homogeneous on the macromolecular level, that is to say, the two components are completely soluble in each other. However, they are incompatible on the thermodynamic level as evidenced by the two separate melting events characteristic for each component observed in differential scanning calorimetry (DSC) experiments. If they were compatible on this level then one would expect to observe a new melting event at a value intermediate of the two individual components.

The blends are further characterized by hardness values falling within the range of 85 Shore A to 75 Shore D. Generally speaking, this range can be attained through the use of just one polyesteramide base polymer along with the appropriate amount of polyamide to obtain the desired hardness level. Additionally, the increase in hardness can be attained without adversely affecting other physical properties. In fact, the high temperature resistant properties of the blends are superior to those of the base polymer.

Furthermore, the addition of the polyamide for some unexplainable reason results in an improvement in the elastic elongation properties of the base polyesteramide. This is even more surprising in view of the fact that the percent elongation values of a majority of the aliphatic polyamides are less than 100 percent while their addition to a polyesteramide of typically 220 percent elongation will raise this latter value above 300 percent.

A further benefit to the polyesteramide through the addition of the polyamide lies in the improved resistance of the blends to various industrial fluids such as Skydrol 500 hydraulic fluid, brake fluid, ASTM #3 oil, lithium grease, toluene, and the like. This benefit is more evident as the level of the polyamide is increased.

Another unexpected benefit characterizing the present blends is their better release properties from molds compared with the base polymer.

The combination of properties inherent in the present blends provide for all of the benefits to be found in the polyesteramides of U.S. Pat. No. 4,129,715 plus the additional ones noted above. Accordingly, the blends can be compression molded, extruded into any type of profile configuration, or injection molded into complicated shapes which release easily from the mold. The molded articles so obtained have good elastic and high temperature resistance and find utility in such applications as seals, gaskets, bushings, and the like.

The following preparations and examples describe the manner and process of making and using the invention and set forth the best mode contemplated by the inventors of carrying out the invention but are not to be construed as limiting.

Preparation of ester-amides

The polyesteramides A, B, and C in accordance with U.S. Pat. No. 4,129,715 and used in the following examples were prepared as follows.

Polyesteramide A

A carboxylic acid terminated prepolymer was prepared from 63 parts by weight (1.40 eq.) of 1,4-butanediol and 171.5 parts by weight (1.82 eq.) of azelaic acid in the presence of 0.23 part by weight of p-toluenesulfonic acid in 191.1 parts by weight of xylene as solvent. The water of condensation was azeotropically removed and when reaction was completed the solvent was removed in vacuo. A portion of the prepolymer (eq. wt.=508) so obtained (60.95 parts by weight or 0.12 eq.) was then reacted with 11.29 parts by weight (0.12 eq.) of azelaic acid, 8.65 parts by weight (0.12 eq.) of adipic acid, and 45.86 parts by weight (0.36 eq.) of 4,4'-methylenebis(phenyl isocyanate) in the presence of 0.23 part by weight ($1.8 \times 10^{-3}$ moles) of 1,3-dimethylphospholene-1-oxide and 440 parts of anhydrous tetramethylene sulfone using the procedure described in U.S. Pat. No. 4,129,715 cited supra. The resulting segmented Polyesteramide A had an inherent viscosity (0.5 g/100 ml.) in N-methylpyrrolidinone (NMP) at 30° C. of 0.77 dl/g. and was characterized by a recurring unit of formula (I) above wherein A is the residue of poly(tetramethylene azelate)glycol, B is the residue of azelaic acid, D in 50 percent of the recurring units is $-CH_2{}_4$ and in the remaining 50 percent is $-CH_2{}_7$, and R is 4,4'-methylenebis(phenylene).

Polyesteramide B

Using the same procedure as described and referenced for Polyesteramide A above 4529 parts by weight (8.29 eq.) of a similar carboxylic acid terminated prepolymer (eq. wt. 546) were reacted with 978 parts by weight (10.4 eq.) of azelaic acid, and 2356 parts by weight (18.7 eq.) of 4,4'-methylenebis(phenyl isocyanate) in the presence of 16.5 parts by weight (0.127 moles) of 1,3-dimethylphospholene-1-oxide and 28,600 parts by weight of anhydrous tetramethylene sulfone. The polyesteramide so obtained had an inherent viscosity of 0.80 dl/g. (0.5 percent w/w in NMP at 30° C.) and was characterized by a recurring unit of formula (I) above wherein A is the residue of poly(tetramethylene azelate)glycol, B and D are residues of azelaic acid and R is 4,4'-methylenebis(phenylene).

Polyesteramide C

Using the same procedure as described above, the following reactants in the proportions by equivalents were reacted together: 1 equivalent of the carboxylic acid terminated poly(tetramethylene azelate) (eq. wt.=about 510), 0.75 equivalent of adipic acid, 2.25 equivalents of azelaic acid, and 4 equivalents of 4,4'-methylenebis(phenyl isocyanate). The polyesteramide so obtained had an inherent viscosity of 1.4 dl/g. (0.5 percent w/w in NMP at 30° C.).

EXAMPLE 1

The following experiment sets forth the preparation of five polymer blends (samples 1 to 5, inclusive) in accordance with the invention prepared by blending the Polyesteramide A with a commercially available polyamide nylon 6 (Capron 8204 supplied by Allied Chemical Corporation). The blends were prepared using as a typical example the following preparation of sample 2.

A 5 percent by weight blend of nylon 6 in polyesteramide A was prepared by admixing in the proportions by weight the following dried components in comminuted form using either a Patterson Portashell mixer or else simply blending them in a glass jar using a roller: 100 parts of Polyesteramide A, 5 parts of Capron 8204, and 1 part of Irganox 1098 (antioxidant supplied by Ciba Geigy Inc.). The blend was homogenized by extrusion as strands (3/16 inch diameter) using a Brabender vented extruder fitted with a screw of L/D ratio 25:1 and having a compression ratio of 3:1. The temperature setting in Zones 1, 2, and 3 was 240° C. and in Zone 4 was 250° C. The extruder was operated at 50 rpm with a torque of ca. 1500 meter-grams. The extruded strands were pelletized. The pellets were then injection molded into various test shapes such as plaques, flex and tensile bars using an Arburg injection molding machine having Zone 1, 2 and 3 temperatures of 450°–500° F. and mold temperature of 100° C. using an injection pressure of 1300 psi.

Using the same proportions of Polyesteramide A and Irganox 1098 but varying the proportions of Capron 8204 accordingly there were similarly prepared the other four samples 1, 3, 4 and 5 containing 1, 10, 25 and 50 percent by weight, respectively, of the nylon 6 in the Polyesteramide A. Sample 6 was a comparison sample of Polyesteramide A and Irganox 1098 alone.

The comparison of the standard hardness and tensile properties observed for the samples 1 to 6 is set forth in Table I. It was observed that the Shore D hardness of Polyesteramide A could be increased without unduly affecting the other properties of the polyesteramide. In fact, unexplainably, the elongation of the blends were all higher than the comparison sample 6 even though the Capron 8204 which was being added within the 1 to 50 percent by weight proportions has elongation values well below 100%.

Table II sets forth the comparison of the ring tensile data (determined according to ASTM teSt method D412) for samples 2 and 5 (containing 5 and 50 percent by weight nylon respectively) versus sample 6. This comparison clearly shows how the tensile properties of the blends, particularly at higher nylon levels, are generally improved over the sample 6 at the higher temperature measurements thereby signifying improved high temperature resistance.

Table III sets forth a comparison of the resistance to three typical industrial fluids of samples 2, 5 and 6. The test samples were cut into pieces measuring 1"×2.5"×0.125" and immersed in the test solvents of Skydrol 500B (Monsanto), toluene, and Brake Fluid (Prestone Dot 3) for 7 days at 22° C. The samples were removed and dried prior to being subjected to the tests shown. The respective percent retention of the original tensile property is shown in brackets in Table III. This data shows the generally better retention of tensile properties of the blends, particularly at higher nylon concentration compared to the sample 6.

TABLE I

| (% by wt. nylon 6) | Sample | | | | | |
|---|---|---|---|---|---|---|
| | 1 (1%) | 2 (5%) | 3 (10%) | 4 (25%) | 5 (50%) | 6 (0%) |
| Hardness, Shore D | 60 | 63 | 63 | 67 | 70 | 55 |

TABLE I-continued

| (% by wt. nylon 6) | Sample 1 (1%) | 2 (5%) | 3 (10%) | 4 (25%) | 5 (50%) | 6 (0%) |
|---|---|---|---|---|---|---|
| Modulus, psi | | | | | | |
| 50% | 2500 | 3380 | 3520 | 4300 | 5160 | 2667 |
| 100% | 2850 | 4300 | 4120 | 4400 | 4880 | 3537 |
| 300% | 4700 | — | — | — | 5560 | — |
| Tensile str., psi | 5000 | 5530 | 5270 | 4500 | 5780 | 4590 |
| Elongation, % | 330 | 250 | 275 | 260 | 310 | 220 |
| Tensile set % | 45 | 43 | 63 | 175 | 190 | 27 |

TABLE II

| Sample | 2 (5%) | 5 (50%) | 6 (0%) |
|---|---|---|---|
| Modulus, psi | | | |
| 50% (68° C.) | 2270 | 5160 | 2034 |
| (100° C.) | 813 | 1900 | 897 |
| (150° C.) | 416 | 1160 | 464 |
| 100% (68° C.) | 3430 | 4880 | 2440 |
| (100° C.) | 1150 | 2240 | 1031 |
| (150° C.) | 586 | 1415 | 501 |
| 300% (68° C.) | 4240 | 5560 | 3999 |
| (100° C.) | 1550 | 3640 | 1442 |
| (150° C.) | 796 | — | 654 |
| Tensile, psi | | | |
| (68° C.) | 4780 | 5780 | 4439 |
| (100° C.) | 2330 | 3910 | 2169 |
| (150° C.) | 947 | 1780 | 672 |
| Elongation, % | | | |
| (68° C.) | 270 | 310 | 357 |
| (100° C.) | 450 | 290 | 556 |
| (150° C.) | 345 | 165 | 329 |

TABLE III

| | 2 (5%) | | | | 5 (50%) | | | | 6 (0%) | | | |
|---|---|---|---|---|---|---|---|---|---|---|---|---|
| | Virgin | Skydrol 500 | Toluene | Brake Fluid | Virgin | Skydrol 500 | Toluene | Brake Fluid | Virgin | Skydrol 500 | Toluene | Brake Fluid |
| Hardness, Shore | 61D | 49D | 52D | 43D | 71D | 69D | 66D | 73D | 55D | 89A | 94A | 93A |
| Modulus, psi | | | | | | | | | | | | |
| 50% | 2270 | 1960 (86%) | 1830 (81%) | 1420 (63%) | 5160 | 4680 (91%) | 4030 (78%) | 5180 (100%) | 2667 | 2665 (100%) | 1775 (67%) | 1386 (52%) |
| 100% | 3430 | 2570 (75%) | 2440 (71%) | 2010 (59%) | 4880 | 4650 (95%) | 4070 (83%) | 4860 (100%) | 3537 | 2950 (83%) | 2355 (67%) | 1916 (54%) |
| 200% | 4170 | 3420 (82%) | 3220 (77%) | 2880 (69%) | 5000 | 4790 (96%) | 4400 (88%) | 4990 (100%) | — | — | — | — |
| 300% | — | — | — | — | 5560 | 6130 (110%) | 5320 (96%) | 5320 (96%) | — | — | — | — |
| Tensile, psi | 4780 | 3850 (81%) | 3710 (78%) | 3050 (64%) | 5780 | 5870 (102%) | 5400 (93%) | 5770 (100%) | 4590 | 3745 (82%) | 3196 (70%) | 2983 (65%) |
| Elongation, % | 270 | 250 (93%) | 260 (96%) | 210 (78%) | 310 | 290 (94%) | 290 (94%) | 290 (94%) | 220 | 175 (80%) | 217 (99%) | 263 (120%) |
| Tensile Set, % | 30 | 40 | 40 | 30 | 190 | 160 | 170 | 190 | 27 | 18 | 36 | 40 |

EXAMPLE 2

Using the same blending procedures and apparatus described in Example 1 above six polymer blends (samples 7 to 12, inclusive) in accordance with the present invention were prepared using the Polyesteramide B prepared above along with comparison sample 13 which was the Polyesteramide B containing only the Irganox 1098. Samples 7 through 9 contained 5, 10, and 20 percent by weight respectively of a polyamide nylon 66 (Vydyne 21X supplied by Monsanto Chem. Co.) along with the Irganox 1098. Samples 10 through 12 contained 5, 10, and 20 percent by weight respectively of nylon 6 (Capron 8204 described above) and the Irganox 1098.

Similarly to Example 1 above the Shore D hardness and tensile properties of the Polyesteramide B could be raised by the inclusion of either the 6 or 66 nylon polyamide while at the same time the elongation properties of the blends increased instead of decreasing with the presence of the nylon.

TABLE IV

| (% by wt. polyamide) | Sample 7 (5%) | 8 (10%) | 9 (20%) | 10 (5%) | 11 (10%) | 12 (20%) | 13 (0%) |
|---|---|---|---|---|---|---|---|
| Hardness, Shore D | 57 | 57 | 62 | 57 | 57 | 60 | 53 |
| Modulus, psi | | | | | | | |
| 50% | 2370 | 2490 | 2880 | 2230 | 2330 | 2580 | 1920 |
| 100% | 2660 | 2780 | 3070 | 2540 | 2630 | 2760 | 2230 |
| 300% | 4030 | 3840 | 3950 | 3600 | 3820 | 3570 | 3220 |
| Tensile str., psi | 3840 | 3890 | 4150 | 3680 | 3800 | 3970 | 3250 |
| Elongation, % | 290 | 300 | 340 | 290 | 300 | 310 | 290 |
| Tensile set, % | 50 | 60 | 130 | 50 | 60 | 100 | 40 |

EXAMPLE 3

Using the same blending procedures and apparatus described in Example 1 above, four polymer blends (samples 14 to 17, inclusive) in accordance with the present invention were prepared using the Polyesteramide B prepared above. The samples contained 10, 20, 30, and 40 percent by weight respectively of the nylon 66 identified above. The same comparison sample 13 as described in Example 2 was used as a reference sample. Additionally, comparison sample 18 was prepared by blending, extruding, and injection molding as previously described the Polyesteramide C prepared above with the 1 percent Irganox 1098. This sample was prepared because of its high hardness value (67 Shore D).

The samples 13 through 17 were tested for their resistance to the three solvents Skydrol 500, Brake Fluid, and ASTM #3 oil (R. E. Carroll, Inc.) using the same procedure described above in Example 2. The percent retention of the various tensile properties for each sample is set forth in TABLE V. The hardness values of the samples 14 to 17 increase relative to sample 13 as the proportion of nylon 66 increases yet the elongation values increase instead of decrease. At the same time the resistance of the samples 14 to 17 to the solvents increase as the level of nylon 66 is increased.

The comparison of sample 18 which is a polyesteramide of the prior art with a Shore D value of 67 can be fairly compared to the sample 17 in accordance with the invention having a 66D hardness. It is to be noted that the latter sample has an elongation of 360% even though it contains 40 percent by weight of the nylon 66 as opposed to the 265% value for sample 18 with no nylon content.

-continued

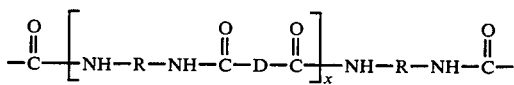

wherein R is selected from the class consisting of arylene of the formulae:

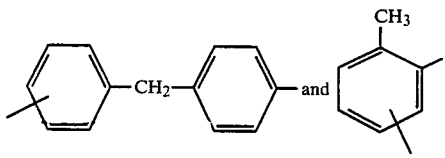

TABLE V

| | 13 (0%) | | | | 14 (10%) | | | |
|---|---|---|---|---|---|---|---|---|
| | Virgin | Skydrol 500 | Brake Fluid | ASTM #3 Oil | Virgin | Skydrol 500 | Brake Fluid | ASTM #3 Oil |
| Hardness, Shore D | 53 | 48 | 48 | 55 | 54 | 49 | 50 | 56 |
| Modulus, psi | | | | | | | | |
| 50% | 1920 | 1660 (86%) | 1330 (69%) | 1910 (99%) | 2190 | 1740 (79%) | 1435 (63%) | 2190 (100%) |
| 100% | 2230 | 1880 (84%) | 1575 (71%) | 2095 (94%) | 2530 | 1960 (77%) | 1640 (65%) | 2315 (92%) |
| 300% | 3220 | — | — | 3040 (94%) | 3540 | — | — | 3415 (96%) |
| Tensile str., psi | 3250 | 2020 (63%) | 1775 (55%) | 3010 (93%) | 3810 | 2200 (58%) | 2200 (58%) | 3370 (88%) |
| Elongation, % | 290 | 147 (51%) | 145 (50%) | 295 (102%) | 320 | 147 (46%) | 220 (69%) | 295 (92%) |
| Tensile Set, % | 40 | 22 | 30 | 45 | 70 | 22 | 55 | 65 |

| | 15 (20%) | | | | 16 (30%) | | | |
|---|---|---|---|---|---|---|---|---|
| | Virgin | Skydrol 500 | Brake Fluid | ASTM #3 Oil | Virgin | Skydrol 500 | Brake Fluid | ASTM #3 Oil |
| Hardness Shore D | 57 | 53 | 53 | 59 | 64 | 62 | 61 | 67 |
| Modulus, psi | | | | | | | | |
| 50% | 2730 | 2140 (78%) | 1890 (69%) | 2465 (90%) | 3710 | 2580 (70%) | 2345 (63%) | 2880 (78%) |
| 100% | 3040 | 2340 (78%) | 2110 (69%) | 2585 (85%) | 3740 | 2790 (75%) | 2600 (70%) | 2995 (80%) |
| 300% | 3950 | — | — | 3445 (87%) | 4290 | — | — | 3760 (88%) |
| Tensile str., psi | 4170 | 2660 (64%) | 2775 (67%) | 3565 (85%) | 4470 | 2960 (66%) | 3255 (73%) | 4210 (94%) |
| Elongation, % | 330 | 177 (54%) | 225 (68%) | 315 (95%) | 320 | 165 (52%) | 235 (73%) | 360 (113%) |
| Tensile Set, % | 120 | 41 | 80 | 105 | 170 | 46 | 105 | 170 |

| | 17 (40%) | | | | 18 (0%) |
|---|---|---|---|---|---|
| | Virgin | Skydrol 500 | Brake Fluid | ASTM #3 Oil | Virgin |
| Hardness, Shore D | 66 | 64 | 65 | 68 | 67 |
| Modulus, psi | | | | | |
| 50% | 3580 | 3470 (97%) | 3630 (101%) | 3430 (96%) | 3915 |
| 100% | 3490 | 3410 (98%) | 3536 (101%) | 3355 (96%) | 4365 |
| 300% | 3820 | — | — | 3590 (94%) | — |
| Tensile str., psi | 4940 | 3420 (69%) | 3775 (76%) | 4465 (90%) | 6120 |
| Elongation, % | 360 | 230 (64%) | 230 (64%) | 350 (97%) | 265 |
| Tensile Set, % | 230 | 131 | 140 | 225 | 27 |

We claim:

1. A polymer blend comprising
(a) from about 99 to about 50 percent by weight of a segmented polyesteramide characterized by a recurring unit of the formula

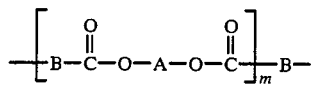  (I)

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 300° C., and x is a number having an average value from zero to 10; and (b) from about 1 to about 50 percent by weight of an aliphatic polyamide.

2. A polymer blend in accordance with claim 1 wherein the residue A in the polyesteramide is that of a polyester glycol.

3. A polymer blend in accordance with claim 2 wherein said polyester glycol is a poly(tetramethylene azelate)glycol.

4. A polymer blend in accordance with claim 1 wherein the residue B in the polyesteramide is that of azelaic acid.

5. A polymer blend in accordance with claim 1 wherein the average value of x in the polyesteramide is greater than 0.

6. A polymer blend in accordance with claim 1 wherein the residue D in the polyesteramide is that of an aliphatic dicarboxylic acid.

7. A polymer blend in accordance with claim 6 wherein the residue is that of azelaic acid.

8. A polymer blend in accordance with claim 6 wherein the residue is that of a 50/50 mole weight mixture of azelaic and adipic acid.

9. A polymer blend in accordance with claim 1 wherein the aliphatic polyamide is a linear polyamide having an inherent viscosity of at least 0.5 dl/g. measured as a 0.5 percent w/w solution in m-cresol.

10. A polymer blend in accordance with claim 9 wherein said polyamide is nylon 6.

11. A polymer blend in accordance with claim 9 wherein said polyamide is nylon 66.

12. A polymer blend in accordance with claim 1 wherein said polyesteramide (a) is present in from about 95 to about 60 percent by weight and said polyamide (b) is accordingly from about 5 to about 40 percent by weight.

13. A polymer blend in accordance with claim 1 comprising (a) from about 95 to about 60 percent by weight of said polyesteramide wherein R is 4,4'-methylenebis(phenylene); A is the residue of a poly(tetramethylene azelate)glycol; B is the residue of azelaic acid; D is the residue of an aliphatic dicarboxylic acid; and x has an average value greater than 0; and (b) from about 5 to about 40 percent by weight of a linear aliphatic polyamide having an inherent viscosity of at least 0.5 dl/g. measured as a 0.5 percent w/w solution in m-cresol.

14. A polymer blend in accordance with claim 13 wherein in said polyesteramide D is azelaic acid and said polyamide is nylon 6 or nylon 66.

15. A polymer blend in accordance with claim 13 wherein in said polyesteramide D is a 50/50 mole weight mixture of azelaic and adipic acids and said polyamide is nylon 6 or nylon 66.

* * * * *